United States Patent
Nelakonda et al.

(10) Patent No.: US 11,164,212 B2
(45) Date of Patent: Nov. 2, 2021

(54) SYSTEMS AND METHODS FOR RELEVANT TARGETING OF ONLINE DIGITAL ADVERTISING

(71) Applicant: Cinarra Systems, Inc., Santa Clara, CA (US)

(72) Inventors: Sathyender Nelakonda, Saratoga, CA (US); Alexey D. Zinin, Cupertino, CA (US); Aman Dhora, Mountain View, CA (US); William J. Leece, San Jose, CA (US)

(73) Assignee: Cinarra Systems, Inc., Santa Clara, CA (US)

( * ) Notice: Subject to any disclaimer, the term of this patent is extended or adjusted under 35 U.S.C. 154(b) by 115 days.

(21) Appl. No.: 15/486,214

(22) Filed: Apr. 12, 2017

(65) Prior Publication Data

US 2018/0300762 A1 Oct. 18, 2018

(51) Int. Cl.
*G06Q 30/02* (2012.01)
*H04L 29/08* (2006.01)

(52) U.S. Cl.
CPC ..... *G06Q 30/0267* (2013.01); *G06Q 30/0252* (2013.01); *G06Q 30/0255* (2013.01); *G06Q 30/0277* (2013.01); *H04L 67/02* (2013.01); *H04L 67/146* (2013.01); *H04L 67/10* (2013.01)

(58) Field of Classification Search
CPC combination set(s) only.
See application file for complete search history.

(56) References Cited

U.S. PATENT DOCUMENTS

| | | | |
|---|---|---|---|
| 9,818,133 B1* | 11/2017 | Bell | G06Q 30/0267 |
| 2002/0046084 A1 | 4/2002 | Steele et al. | |
| 2006/0149844 A1 | 7/2006 | Droz et al. | |
| 2008/0065774 A1 | 3/2008 | Keeler | |
| 2008/0172495 A1 | 7/2008 | Storm | |
| 2008/0256216 A1 | 10/2008 | Aarts | |
| 2009/0089420 A1 | 4/2009 | Caruso et al. | |
| 2010/0180013 A1 | 7/2010 | Shkedi | |
| 2010/0228593 A1 | 9/2010 | Belwadi et al. | |
| 2010/0228625 A1 | 9/2010 | Priyadarshan et al. | |
| 2010/0291907 A1 | 11/2010 | MacNaughtan et al. | |

(Continued)

FOREIGN PATENT DOCUMENTS

| | | | |
|---|---|---|---|
| CN | 104657428 A | * | 5/2015 |
| WO | WO2015/027074 A2 | | 2/2015 |

OTHER PUBLICATIONS

Nelakonda et al.; U.S. Appl. No. 15/480,243 entitled "Systems and methods for cookieless opt-out of device specific targeting," filed Apr. 5, 2017.

(Continued)

*Primary Examiner* — Marie P Brady
(74) *Attorney, Agent, or Firm* — Shay Glenn LLP (57) ABSTRACT

System and methods for selecting and serving a targeted digital advertisement to a user are provided. In one implementation, an advertisement platform server receives an ad transaction pixel from a user device. Based on the ad transaction pixel, the server initiates a discovery process in order to discover the identity of the user device. The server then receives a device targeted ad request from the user device, and sends a device targeted ad response to the user device based on results from the discovery process.

23 Claims, 3 Drawing Sheets

(56) References Cited

U.S. PATENT DOCUMENTS

| | | |
|---|---|---|
| 2011/0055021 A1 | 3/2011 | Haag |
| 2011/0265116 A1 | 10/2011 | Stern et al. |
| 2012/0014316 A1 | 1/2012 | Rahman |
| 2012/0054143 A1* | 3/2012 | Doig ............... G06Q 30/0269 706/47 |
| 2012/0116838 A1 | 5/2012 | Bisdikian et al. |
| 2012/0158472 A1* | 6/2012 | Singh ................ G06F 16/29 705/14.4 |
| 2012/0278161 A1 | 11/2012 | Lazzaro |
| 2012/0316992 A1 | 12/2012 | Oborne |
| 2013/0121252 A1 | 5/2013 | Peng et al. |
| 2013/0124309 A1* | 5/2013 | Traasdahl .......... G06Q 30/0251 705/14.49 |
| 2013/0124331 A1 | 5/2013 | Doughty et al. |
| 2013/0173788 A1 | 7/2013 | Song |
| 2013/0288668 A1 | 10/2013 | Pragada et al. |
| 2014/0032727 A1 | 1/2014 | Kano et al. |
| 2014/0059192 A1 | 2/2014 | Miklós |
| 2014/0095297 A1 | 4/2014 | O'Reilly |
| 2014/0129352 A1* | 5/2014 | Ringdahl ........... G06Q 30/0275 705/14.71 |
| 2014/0258434 A1 | 9/2014 | Hong et al. |
| 2014/0365311 A1 | 12/2014 | Eulenstein et al. |
| 2015/0019721 A1* | 1/2015 | Zinin ................. H04L 67/16 709/224 |
| 2015/0067118 A1 | 3/2015 | Gatto et al. |
| 2015/0088663 A1 | 3/2015 | Schechter et al. |
| 2015/0089061 A1 | 3/2015 | Li et al. |
| 2015/0106198 A1 | 4/2015 | Miller et al. |
| 2015/0113564 A1 | 4/2015 | Mushikabe |
| 2015/0154632 A1 | 6/2015 | Jindal et al. |
| 2015/0262235 A1 | 9/2015 | Neal et al. |
| 2015/0310485 A1 | 10/2015 | Brown |
| 2015/0312255 A1* | 10/2015 | Libonate ............. H04L 63/0876 713/168 |
| 2015/0324857 A1* | 11/2015 | Siegel ................ G06Q 30/0269 705/14.64 |
| 2015/0358818 A1 | 12/2015 | Dipaola |
| 2016/0110775 A1 | 4/2016 | Moiz et al. |
| 2016/0117740 A1 | 4/2016 | Linden et al. |
| 2016/0155143 A1 | 6/2016 | Hsiao et al. |
| 2016/0182658 A1* | 6/2016 | Allinson ............. H04L 67/306 709/224 |
| 2016/0232570 A1 | 8/2016 | Wilson |
| 2016/0247188 A1 | 8/2016 | Zhou |
| 2017/0091815 A1 | 3/2017 | Brill et al. |
| 2017/0337589 A1 | 11/2017 | Yu |
| 2018/0053218 A1 | 2/2018 | Singh et al. |
| 2019/0080350 A1* | 3/2019 | Hughes .............. G06Q 30/0246 |

OTHER PUBLICATIONS

Nelakonda et al.; U.S. Appl. No. 15/642,124 entitled "Systems and methods for cookieless conversion measurement of online digital advertising," filed Jul. 5, 2017.

* cited by examiner

SYSTEMS AND METHODS FOR RELEVANT TARGETING OF ONLINE DIGITAL ADVERTISING

CROSS REFERENCE TO RELATED APPLICATIONS

This application is related to U.S. Published Application No. 2015/0019721, filed on Jul. 11, 2014, and entitled "Method And System For Correlation Of Internet Application Domain Identities And Network Device Identifiers," which claims priority to and the benefit of U.S. Provisional Patent Application No. 61/845,331, filed on Jul. 11, 2013, and entitled "Method And System For Correlation Of Internet Application Domain Identities And Network Device Identifiers."

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

Field of Innovation

This disclosure is generally related to interworking between internet applications, such as web services and mobile apps, and telecommunication provider networks and services for the purpose of improving targeting of online digital advertisements using information inside telecommunications provider networks and systems.

DESCRIPTION OF THE RELATED ART

Developers of internet applications, such as web services and mobile apps (e.g., Apple iOS or Android OS applications) consistently strive to provide a personalized experience to their end users by equipping the applications with the ability to store user-specific settings or user preferences. Applications utilize different mechanisms to achieve this goal: web applications use the Hypertext Transfer Protocol (HTTP) cookie mechanism (HTTP Cookie), mobile apps make use of persistent device or user identifiers such as universally unique identifier (UUID), open device identification number (ODIN), or Identifier for Advertisers (IDFA) or Google's Advertising ID. While different in implementation, the above methods rely on the property that a certain unique piece of data that is associated with a particular user (or an application initiated by the user) remains consistent for a sufficient duration of time, and is exchanged by the involved parties (e.g., the web browser and the web server, or the mobile application and the mobile back-end server) for the purpose of identifying the user. These application-level identities can be utilized exclusively by the applications or may be passed on to other components for the purpose of providing the user with customized data. As a non-limiting example, a web page that includes a web advertisement may pass the user-associated cookie to the web advertising platform for the purpose of selecting the most relevant ad for the particular user. Similarly, a mobile application that integrates with a mobile ad platform may pass the associated universal device identifier (UDID), or OpenUDID, to the advertising platform for the purpose of ad targeting. Applications may use the above identifiers in a similar fashion to select more relevant content (e.g., music or video) for the end user.

Telecommunication providers typically operate with the user devices at a lower level, such as the mobile network (e.g., Wi-Fi, or Global System for Mobile Communications (GSM)/Universal Mobile Telecommunications System (UMTS) network) providing connectivity at the physical level, or at the network level, such as an Internet Protocol (IP) network, by providing transport capabilities to Internet and mobile applications. Providers' networks are typically concerned with network-level device identifiers (such as Media Access Control (MAC) addresses, International Mobile Subscriber Identity (IMSI), International Mobile Station Equipment Identity (IMEI), Mobile Station International Subscriber Directory Number (MSISDN) or IP addresses), and do not have direct visibility of application-level identifiers discussed earlier. The role of the provider's network for the applications is to deliver data packets from one device to another using routing and switching mechanisms that utilize network-level identifiers to identify a particular device. Network-level identifiers are also used by provider networks to perform mobility management purposes and consolidate accounting and billing information.

Clear separation of responsibilities between telecommunication providers and application platforms has its advantages, such as improved scalability (since the provider networks need only be aware of devices, and not all applications running on them), as well as privacy (providers normally do not know which specific applications are installed and utilized by the users). However, a number of cases have recently arisen in which the ability of applications and provider systems to interwork would present particular advantages to the end user. As a specific example, enabling a mobile network provider to help advertising platforms better target advertisements by utilizing, for example, location and statistical information about its subscribers would benefit the end users, as it would minimize delivery of unrelated ads. For a provider to participate in the ad targeting process (or any other process requiring understanding of the application-level identities), a mechanism to establish a relationship between application-level identities and network-level device identifiers is desirable. Such a mapping allows utilization of provider intelligence about devices at the application level.

One of the largest problems faced today by advertisers and marketers using programmatic ad buying platforms is that of targeting consumers based on their past activities. This is due to the non-persistence of user identifiers that are commonly used in advertising ecosystems. This problem is particularly prevalent when consumers use browsers that by default do not allow lookup of cookie identifiers by third parties. Apple's Safari browser is a specific example of a browser that does not allow $3^{rd}$ parties to lookup any cookies they may have placed in a consumer's web browser. Because of this problem, the targeting of ad opportunities from mobile web traffic, is extremely challenging. For example, when a mobile subscriber who is using an iOS device (iPhone and iPad) and a Safari web browser (in its default mode) and browsing mobile web sites triggers an ad call to an advertisement exchange, the exchange will not recognize the user or device from any cookies the exchange previously assigned. Accordingly, the ad exchange assigns a new cookie to the subscriber's browser before sending out a bid request to the ad bidding platforms. When this cookie is extracted (from an Advertisement Bid Request) by the ad bidders, the user/device is not recognized and is treated as previously unknown user/device. This results in untargeted/ irrelevant ads getting served to (most of the) subscribers that are visiting mobile web sites with the default Safari browser settings enabled. Serving these such ads repeatedly to the same user/device is very inefficient, as it delivers irrelevant ads to the user/device and wastes the advertising budgets of the advertisers. This problem is compounded by the following reason: As of early 2016, approximately 90% of the inventory from certain ad exchanges is coming from the web as opposed to mobile applications.

What is needed and is not provided by the prior art are systems and methods that serve targeted advertisements to the above users (i.e., ads relevant and appropriate to the particular user), without requiring the use of cookies.

SUMMARY OF THE DISCLOSURE

System and methods for selecting and serving a digital advertisement targeted/relevant to a user are disclosed herein. In one implementation an ad request is received by the ad selection and serving platform/server from the user device. Based on the advertising identity in the request, the platform/server sends back a piece of code (ad code) to the user device which executes on the user device; this code fetches/downloads the ad from the ad serving platform/ server. If the identity of the user is known to the ad selection and serving platform/server, it returns the digital advertisement targeted/relevant to the user. This is the desirable scenario as the targeted/relevant ads are more effective and have a higher likelihood of positive results. On the other hand, if the identity of the user is not known, digital ads that are generic are selected by the ad selection and serving platform/server and that may not resonate with the user which makes it less effective. The applicants have devised a way to deliver targeted/relevant digital ads to the unknown users/devices from the very outset by breaking it down into two stages.

According to aspects of some embodiments of the present disclosure, the applicants have devised a way to target users on mobile devices, for example, based on location, demographic and/or interest segment from the very outset, meaning from the first ad served to the user. This is accomplished by initiating a discovery process during the serving of an initial ad and selecting the actual ad served based on the results of the discovery process initiated in parallel to the ad serving. The discovery initiated in parallel to the ad serving is completed in a timely manner so that the results of the discovery are used to serve an ad targeted to (i.e., relevant and appropriate to) the user.

In some embodiments, a system for selecting and serving a targeted digital advertisement to a user comprises an advertisement platform server. The server comprises at least one memory for storing computer-executable instructions and at least one processor for executing the instructions. The execution of the instructions programs the server to perform various operations. These operations include receiving an initial ad request from a user device, sending a generic ad response to the user device, the generic ad response including a discovery pixel and an ad transaction pixel, initiating a discovery process based on the reception of the discovery pixel from the user device, receiving the ad transaction pixel from the user device to re-trigger the initial ad request, sending a relevant, targeted ad response to the user device based on the results of the discovery process, receiving an ad download request from the user device, and sending back the ad specified in the ad download request.

The system may further include an advertisement network configured to send and receive instructions with the user device. The advertisement network may be further configured to send and receive instructions with the advertisement platform server. The instructions received from and sent to the user device by the advertisement network may include a device ad request and a device ad response. The instructions sent to and received from the advertisement platform server by the advertisement network may include an ad recommendation request and an ad recommendation response.

In some embodiments, the operations performed by the server further comprise receiving an ad download request from the user device and sending an ad download to the user device. In some embodiments, the ad download to the user device comprises an ad that is targeted to a user of the device.

The operations performed by the server may further comprise receiving a data request having an application-level identifier and a transitory network-level identifier, determining a stable network-level identifier based on the transitory network-level identifier, and mapping the application-level identifier to the stable network-level identifier. The determining may comprise extracting the transitory network-level identifier from the data request, and resolving the stable network-level identifier based on IP address allocation records corresponding to the transitory network-level identifier.

The system may further comprise an application integration agent for providing customized content based on the mapping between the application-level identifier and the stable network-level identifier. The application-level identifier may be selected from the group consisting of an HTTP cookie, a UUID, an ODIN, an IDFA, Advertising ID or a UDID. The transitory network-level identifier may comprise an IP address. The stable network-level identifier may be selected from the group consisting of a MAC address, an IMEI, an IMSI and a MSISDN.

According to aspects of the disclosure, a method of selecting and serving a targeted digital advertisement to a user is provided. In some embodiments, the method comprises receiving an initial ad request from a user device on an advertisement platform server, sending a generic ad response to the user device from the advertisement platform server, the generic ad response including a discovery pixel and an ad transaction pixel, initiating a discovery process based on the reception of the discovery pixel from the user device, receiving the ad transaction pixel from the user device to re-trigger the initial ad request, sending a relevant, targeted ad response to the user device based on the results of the discovery process, receiving an ad download request on the advertisement platform server from the user device, and sending back the ad specified in the ad download request to the user device.

In some embodiments, the method further comprises an advertisement network sending and receiving instructions with the user device. The advertisement network may further send and receive instructions with the advertisement platform server. The instructions received from and sent to the user device by the advertisement network may comprise a device ad request and a device ad response. The instructions sent to and received from the advertisement platform server by the advertisement network may comprise an ad recommendation request and an ad recommendation response.

In some embodiments, the method further comprises the advertisement platform server receiving an ad download request from the user device, and sending an ad to the user device. In some embodiments, the ad download to the user device comprises an ad that is targeted to a user of the device.

In some embodiments, the method further comprises the advertisement platform server receiving a data request having an application-level identifier and a transitory network-level identifier. Based on the transitory network-level identifier, the server then determines a stable network-level identifier, and maps the application-level identifier to the stable network-level identifier. The determining may comprise extracting the transitory network-level identifier from the data request, and resolving the stable network-level identifier based on IP address allocation records corresponding to the transitory network-level identifier. The application-level identifier may be selected from the group consisting of an HTTP cookie, a UUID, an ODIN, an IDFA, Advertising ID or a UDID. The transitory network-level identifier may comprise an IP address. The stable network-level identifier is selected from the group consisting of a MAC address, an IMEI, an IMSI and an MSISDN.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

The present disclosure is illustrated by way of example and not by way of limitation in accompanying drawings in which like references indicate similar elements. It should be noted that references to "an" or "one" or "some" embodiment(s) in this disclosure are not necessarily to the same embodiment, and such references mean at least one.

Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and multiple hosts can be connected by one or more networks.

As used herein, the terms "engine" and "server" may refer to software, firmware, hardware, or any other component that is used to effectuate a purpose. The engine or server may include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program may include calls to hardware components (such as input/output (I/O) devices), which may require the execution of drivers. The drivers may or may not be considered part of the engine or server.

As used herein, the term "database" is used broadly to include any known or convenient means for storing data, whether centralized or distributed, relational or otherwise.

As used herein, the term "mobile device" may be, but is not limited to, a cell phone, such as an Apple iPhone, a portable electronic device, such as an Apple iPod Touch, Apple iPad, Microsoft Surface, and a mobile device based on the Google Android operating system, a smart watch, smart glasses, and any other portable electronic device that includes software, firmware, hardware, or a combination thereof that is capable of providing the functionality described herein. Typical components of the mobile device may include, but are not limited to, persistent memories like flash read-only memory (ROM), random access memory like static random-access memory (SRAM), a camera, a battery, liquid crystal display (LCD) driver, a display, a cellular antenna, a speaker, a Bluetooth circuit, and Wi-Fi circuitry, where the persistent memory may contain programs, applications, and/or an operating system for the mobile device.

As used herein, the term computer can be but is not limited to, a personal computer or a laptop, such as a Hewlett-Packard Pavilion desktop computer, Dell Ultrabook laptop, Apple MacBook laptop, or other electronic device based on an operating system such as Microsoft Windows or Apple OS X, and any other electronic device that includes software, firmware, hardware, or a combination thereof that is capable of providing the functionality described herein. Typical components of the computer may include but are not limited to persistent memories like flash ROM, random access memory like SRAM, a battery, a hard-disk or solid-state drive, a display adapter, a network controller used for connecting to a fixed-line network, a speaker, a Bluetooth circuit, and Wi-Fi circuitry, where the persistent memory may contain programs, applications, and/or an operating system for the computer.

Various implementations of the systems described herein can use appropriate hardware or software; for example, certain components can execute on server class computers that have sufficient memory, data storage, and processing power and that run a server class operating system (e.g., Oracle® Solaris®, GNU/Linux®, and the Microsoft® Windows® family of operating systems) or other hardware (e.g., mobile devices, computers, etc.) capable of running an operating system such as the Microsoft Windows® operating systems, the Apple OS X® operating systems, the Apple iOS® platform, the Google Android™ platform, the Linux® operating system and other variants of UNIX® operating systems, and the like. The system can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

In various implementations, the devices include a web browser, client software, or both. The web browser allows the device to request a web page or other downloadable program, applet, or document (e.g., from a server) with a web page request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the device manually requests a web page from the server. Alternatively, the device automatically makes requests with the web browser. Examples of commercially available web browser software are Microsoft® Internet Explorer®, Mozilla® Firefox®, Apple® Safari® and Google Chrome®

In some implementations, the devices include client software. The client software provides functionality to the device that provides for the implementation and execution of the features described herein. The client software can be implemented in various forms, for example, it can be in the form of a web page, widget, and/or Java, JavaScript (JS), .Net, Silverlight, Flash, and/or other applet or plug-in that is downloaded to the device and runs in conjunction with the web browser. The client software and the web browser can be part of a single client-server interface; for example, the client software can be implemented as a "plug-in" to the web browser or to another framework or operating system. Any other suitable client software architecture, including but not limited to widget frameworks and applet technology can also be employed with the client software.

Communication among servers, computers, mobile devices, and other components can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are contemplated. The network can carry TCP/IP protocol communications, and HTTP/HTTPS requests made by a web browser, and the connection between the user devices and servers can be communicated over such TCP/IP networks. Other communication protocols are contemplated.

Method steps of the techniques described herein can be performed by one or more programmable processors executing one or more computer programs to perform functions by operating on input data and generating output. Method steps can also be performed by, and the modules can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store instructions that, when executed by a processor, form the modules and other components described herein and perform the functionality associated with the components. The processor and the memory can be supplemented by, or incorporated in special purpose logic circuitry.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 1:
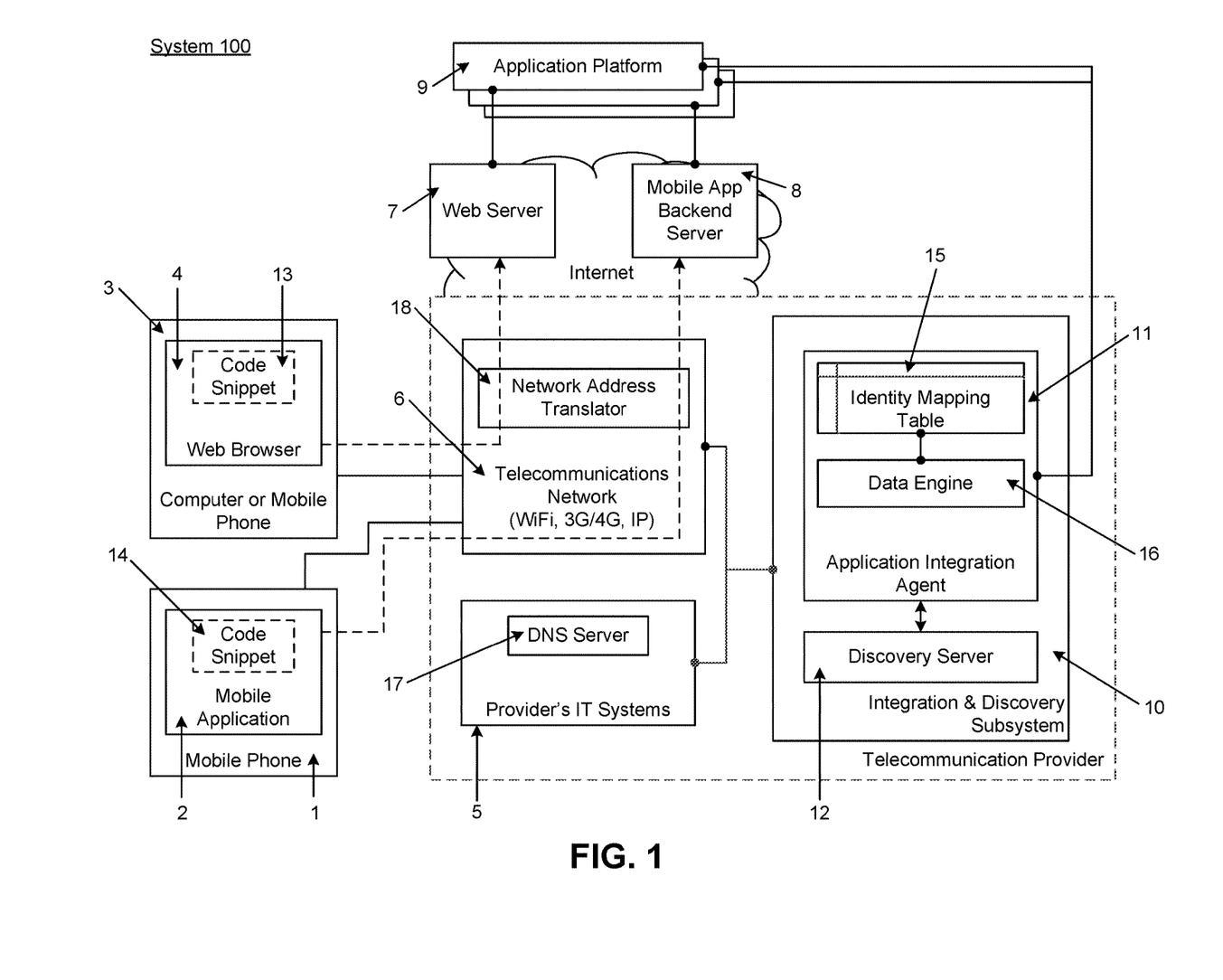
FIG. 1 is a diagram depicting a system architecture according to an aspect of the disclosure.

An exemplary embodiment of a system configured according to aspects of the present disclosure is illustrated in FIG. 1. A system 100 is provided that includes the following elements: a collection of mobile phones (1) and computers (3), jointly referred to as "devices," executing mobile applications (2) or web browsers (4). Devices are provided access to the Internet by connecting to the service provider's (5) telecommunication network (6) using one or more of multiple access technologies. In one embodiment of the present disclosure, the devices (1, 3) are connected using Wi-Fi technology. In another embodiment of the disclosure, the devices (1, 3) can be connected using 3G or 4G cellular technologies such as GSM, UMTS or Wideband Code Division Multiple Access (WCDMA).

The web browser (4) requests an HTML web page by establishing an HTTP connection over the Internet to the web server (7). Similarly, the mobile application (2) submits a request to and receives a response from the back-end server (8) using one of the transport protocols and data serialization technologies. As a non-limiting example, the application (2) may use an HTTP-based protocol with queries and responses encoded in HTML or Extensible Markup Language (XML). When the web browser (4) sends its initial request to a web server (7), the web server (7) has the option of providing the browser (4) with an unique HTTP cookie that is stored by the browser (4) and will be included in all subsequent HTTP requests to the same web server (7), which will use it to determine that the requests are coming from the same user.

When a mobile application (2) first initiates execution, it may allocate or calculate a unique device or user identifier using one of the methods provided by the mobile operating systems. As a non-limiting example, applications (2) executing on the Android operating system may use Advertising ID or UUID, those running on Apple iOS may utilize IDFA, and some or all applications (2) may choose to create application-specific accounts for each user and utilize a unique application-specific user ID. The application (2) then includes the identifier in its protocol queries to the back-end server (8), that uses the identifier to distinguish different users and provide customized data. In its normal operation, the role of the telecommunication network (6) of the provider (5) may include routing packets that encapsulate application-level protocol packets (such as HTTP) from devices (1, 3) to servers (7, 8) and back, and the network (6) may not have visibility of the application-level identifiers and may not employ any mechanisms to establish a relationship between them and the network-level device identifiers of the user, such as the MAC address, mobile phone IMEI, IMSI, MSISDN, or other stable identifier. For example, an operator may provide a salted hash of a MAC address as a network-level device identifier.

The present disclosure introduces an Integration and Discovery Subsystem (10) that includes one or more Application Integration Agents (AIA) (11) and one or more Discovery Servers (DS) (12). The AIA (11) integrates with the Application Platform (9) that provides content to the web and mobile applications (2, 4). In one embodiment of the disclosure, the Application Platform (9) is an advertising platform that integrates with the web server (7) and/or the mobile app back-end server (8) and dynamically supplies Internet advertising units to the servers (7, 8) in the form of snippets of dynamically interpreted code (13, 14) that are provided to the client web browser (4) or mobile application (2) as part of a web page or response to the data query, and are dynamically rendered by the browser (4) and the mobile application (2), triggering additional protocol requests to fetch the components referenced in the code snippet. As a non-limiting example, the code snippets may be represented as HTML code snippets dynamically rendered by the web browser (4) or an HTML rendering library in the application (2), and individual components may be represented by images or JavaScript code obtained through HTTP requests. In another embodiment of the disclosure, the Application Platform (9) provides the servers (7, 8) with dynamically generated content describing certain content of user interest (video, music, books, as non-limiting examples) similarly encoded in HTML snippets or any other dynamically interpreted languages (such as XML) that triggers the client web or mobile application (2, 4) to request images or other scripts through additional protocol requests.

Through integration with the Application Platform (9), the AIA (11) is able to participate in data transactions initiated by the web and mobile applications (2, 4) and provide units of content or other data that may subsequently be included by the Application Platform (9) in its responses to the applications (2, 4). This serves two goals: (a) establishment of the initial mapping between the application-level identities and network-level device or user identifiers, and (b) subsequent customization of application user data content, based on the Identity Mapping Table (IMT) (15) maintained by the AIA (11) and user analytics data created by the Data Engine (16), by utilizing information inside the provider's network (6) and IT systems (5).

Figure 2:
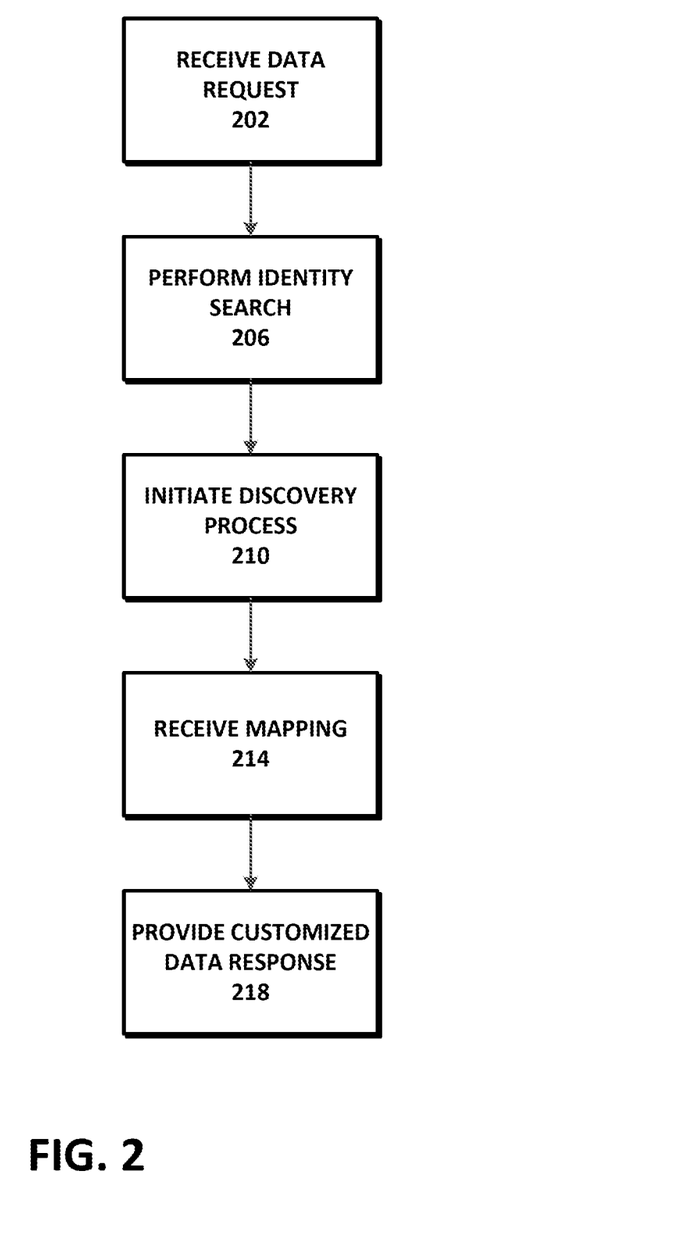
FIG. 2 is a flowchart depicting an example method for determining a relationship between an application-level identifier and a network-level identifier according to an aspect of the disclosure.

In one embodiment, referring to FIG. 2, in the initial state, the AIA's Identity Mapping Table (15) is empty. When the AIA (11) receives a request for data from the Application Platform (9) (STEP 202), it performs a search operation in the IMT (15) for the user identity provided in the request (web cookie or mobile application identifier) (STEP 206). The result of the search for the first transaction will be negative, and the AIA (11) initiates the discovery process described below (STEP 210). As a result of the discovery process, the AIA (11) obtains mapping between the application identity and the network-level identifier from the Discovery Server (12) (STEP 214). Subsequently, the AIA (11) uses the mapping to provide a customized data response to the Application Platform (9) (STEP 218).

Figure 3:
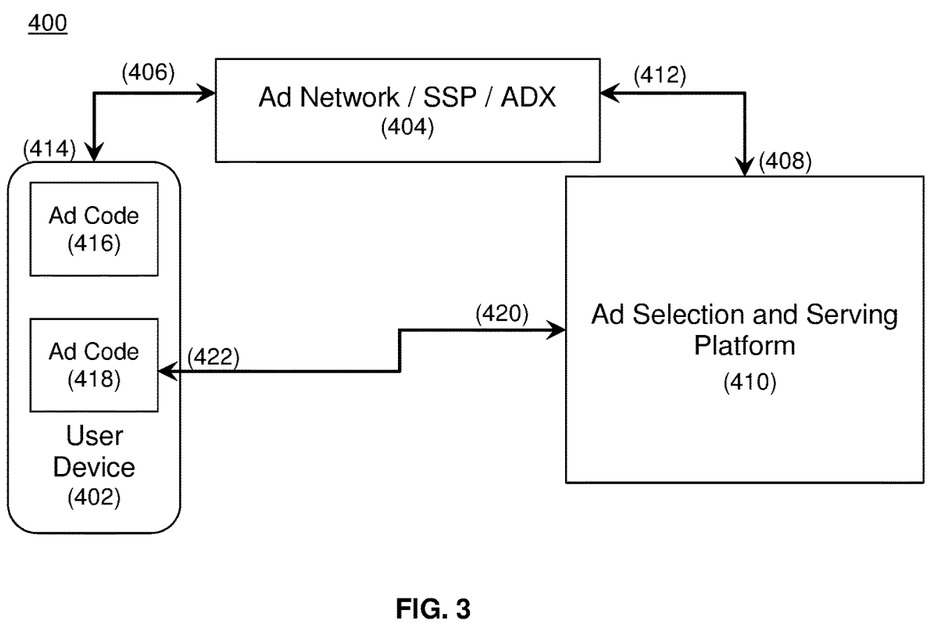
FIG. 3 is a diagram depicting an exemplary embodiment of a conventional system configured to select and serve generic ads to a user device.

Referring to FIG. 3, an exemplary embodiment of a conventional system 400 configured to select and serve ads to a user device is illustrated. Typically, when a user browses a web page that includes one or more slots for showing ads, the user's browser makes calls to an ad exchange, such as by using Application Program Interface (API), to request ad(s) to populate the slot(s). The ad exchange can select an ad from its own inventory or consult with a partner platform to get a recommendation based on various parameters. The recommended ad is sent as a HTML/JS code snippet to the user device. The user device interprets the code, downloads the actual ad and renders it on the user device. More specifically as shown in FIG. 3, user device 402 sends an ad request to advertising network 404, as depicted by arrow 406. Ad network 404 in turn sends an ad recommendation request 408 to an advertisement selection and serving platform 410. Ad selection and serving platform 410 responds to ad network 404 with a code that represents an ad recommendation response 412. The ad network 404 delivers this code to device 402 in the form of device ad response 414, such that ad code 416 is provided to device 402. Ad code 416 can be in the form of snippets of dynamically interpreted code that are provided to the device web browser or mobile application as part of a web page or response to the data query, and are dynamically rendered by the browser or mobile application. This triggers additional protocol requests to fetch the components referenced in the code snippet 416. In particular, ad code 418 in device 402 generates an ad download request 420 from device 402 to ad selection and serving platform 410. Ad selection and serving platform 410 responds by providing device 402 with the ad download 422.

Based on the settings in the browser of device 402 in the conventional system described above, the ad request 406 does not always send enough information to identify the user. This causes all the platforms to be unable to intelligently process the ad request 406 from a user they already know about, so the platforms end up recommending (and subsequently serving) an ad that is targeted or filtered based on certain technical parameters in the ad request 406, but not based on the identity of the known user. In the absence of a persistent identifier/cookie in the ad request 406 which is used to locate the user preferences/profile, the advertisement platform is unable to recommend relevant ads. This makes the advertising opportunity unattractive to advertisers and marketers.

Figure 4:
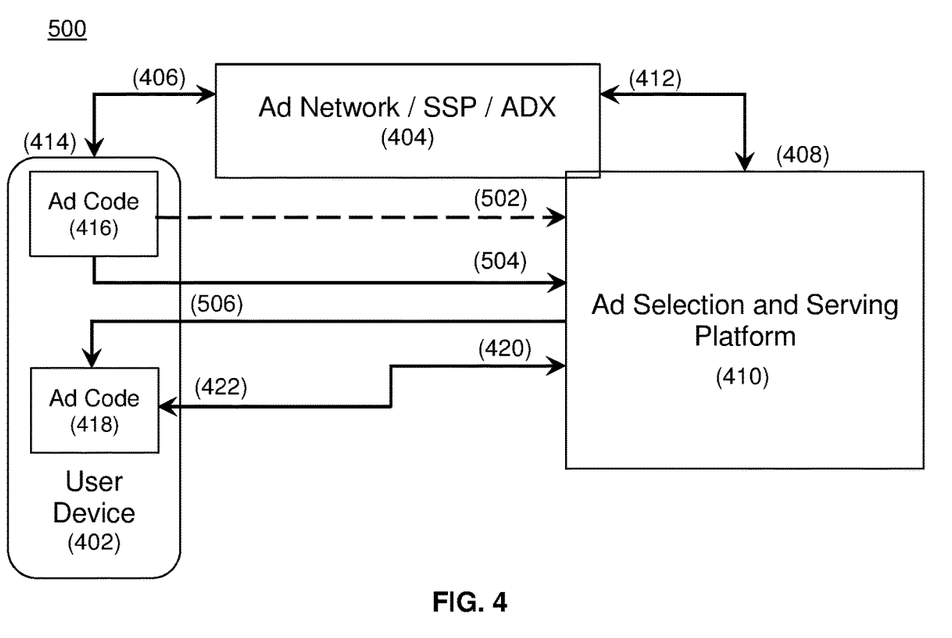
FIG. 4 is a diagram depicting an exemplary embodiment of a system configured according to aspects of the disclosure to select and serve targeted ads to a user device.

Referring now to FIG. 4, an embodiment of the present disclosure is shown that overcomes the shortcomings of the previously described conventional advertisement platform shown in FIG. 3 in order to serve targeted ads to users.

System 500 depicted in FIG. 4 works in tandem with the cookie-less targeting system described above in reference to FIGS. 1-2.

In system 500, the device ad request 406, ad recommendation request 408, ad recommendation response 412, and device ad response 414 operate in much the same way as previously described in reference to system 400 of FIG. 3. However, in system 500 when generic/non-targeted ad code 416 is received by user device 402, it includes a discovery pixel and an ad transaction pixel. The discovery pixel and the ad transaction pixel are forms of tracking pixels. Device 402 then sends the discovery pixel 502 to ad selection and serving platform 410. This initiates a "discovery process", such as previously described in reference to FIGS. 1 and 2. If the discovery process is successful, a network-level device identifier associated with device 402 is obtained, such as a MAC address, mobile phone IMEI, IMSI, MSISDN or other stable identifier. This allows preferences and/or profile information about the device user that may have been previously associated with the stable identifier to be used to select an ad that is more relevant to the user. By way of non-limiting examples, previously associated information may include the device location profile(s), or search profile(s), site visit profiles(s), e-commerce profile(s), etc. based on the past history of the device user.

After device 402 sends discovery pixel 502, it waits for a predetermined period of time to allow the discovery process to be successfully completed. In some embodiments, this predetermined delay varies between 20 and 500 milliseconds, or in other embodiments up to 2 seconds. After the delay, device 402 then sends the ad transaction pixel 504 to ad selection and serving platform 410, as shown. Platform 410 is now able to respond to device 402 with an ad that is targeted to the particular user, by sending device targeted ad response 506 as shown. The previously sent generic ad embodied in ad code 416 will be replaced with a targeted ad embodied in ad code 418, based on the timely reception of 418. When device 402 sends ad download request 420, platform 410 is able to respond with ad download 422 that is the targeted ad, if the sequence of events result in identifying the user/device. The above sequence of events occurs in real time, such that the user does not perceive a delay and the display of the selected ad (generic or relevant/targeted) is seamless.

The above sequence allows advertisers to reach and engage previously unknown users/devices by serving them ads relevant to their preferences and tastes. This in turn significantly improves the pricing of web advertising inventory for Supply Side Platforms (SSPs), making it more appealing to a vast array of advertisers and/or marketers to reach target audiences. System 500, and variations thereof, links the transient IDs in each ad request to anonymized device identifiers to allow for determining user preferences. User privacy is still respected since the user is allowed to opt-out, and no additional cookies are required to be dropped into the device browsers, by the proposed scheme.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A system for selecting and serving a targeted digital advertisement to a user, the system comprising:
an advertisement platform server comprising at least one memory for storing computer-executable instructions and at least one processor for executing the instructions, wherein the execution of the instructions programs the advertisement platform server to perform operations comprising:
a. receiving on the advertisement platform server an initial ad request from a user device;
b. sending a generic ad response to the user device from the advertisement platform server, the generic ad response including a discovery pixel and an ad transaction pixel, the discovery pixel and the ad transaction pixel each being a snippet of code;
c. initiating a discovery process by the advertisement platform server based on the reception of the discovery pixel from the user device;
d. using an identity mapping table maintained by a telecommunications provider to establish a relationship between an application-level identity on the user device and a network-level device identifier;
e. utilizing intelligence about the user device at the application level based on the relationship established in step (d);
f. after a predetermined period of time has elapsed from when the discovery pixel was sent by the user device to the advertisement platform server, receiving the ad transaction pixel from the user device on the advertisement platform server;
g. prompted by the ad transaction pixel received by the user device in step (f), re-triggering the initial ad request by sending a relevant, targeted ad response to the user device based on results from steps (c), (d), and (e);
h. prompted by the ad transaction pixel in step (f) and the targeted ad response in step (g), receiving on the advertisement platform server an ad download request from the user device; and
i. sending back the ad requested in step (h) to the user device.

2. The system of claim 1, further comprising an advertisement network configured to send and receive instructions with the user device and configured to send and receive instructions with the advertisement platform server.

3. The system of claim 2, wherein the instructions received from and sent to the user device by the advertisement network comprise a device ad request and a device ad response.

4. The system of claim 2, wherein the instructions sent to and received from the advertisement platform server by the advertisement network comprise an ad recommendation request and an ad recommendation response.

5. The system of claim 1, wherein the execution of the instructions programs the advertisement platform server to perform operations that further comprise receiving an ad download request from the user device and sending an ad download to the user device.

6. The system of claim 5, wherein the ad download to the user device comprises an ad that is targeted to a user of the device.

7. The system of claim 1, wherein the execution of the instructions programs the advertisement platform server to perform operations that further comprise receiving a data request having an application-level identifier and a transitory network-level identifier, determining a stable network-level identifier based on the transitory network-level identifier, and mapping the application-level identifier to the stable network-level identifier.

8. The system of claim 7, wherein the determining comprises: extracting the transitory network-level identifier from the data request; and resolving the stable network-level identifier based on Internet Protocol (IP) address allocation records corresponding to the transitory network-level identifier.

9. The system of claim 7, further comprising an application integration agent for providing customized content based on the mapping between the application-level identifier and the stable network-level identifier.

10. The system of claim 7, wherein the application-level identifier is selected from the group consisting of a Hypertext Transfer Protocol cookie mechanism (HTTP cookie), a universally unique identifier (UUID), an open device identification number (ODIN), an Identifier for Advertisers (IDFA), an "Advertising ID" provided by Google Play services and a universal device identifier (UDID).

11. The system of claim 7, wherein the transitory network-level identifier comprises an Internet Protocol (IP) address.

12. The system of claim 7, wherein the stable network-level identifier is selected from the group consisting of a Media Access Control (MAC) address, an International Mobile Station Equipment Identity (IMEI), an International Mobile Subscriber Identity (IMSI) and a Mobile Station International Subscriber Directory Number (MSISDN).

13. A method of selecting and serving a targeted digital advertisement to a user, the method comprising:
   a. receiving an initial ad request from a user device on an advertisement platform server;
   b. sending a generic ad response to the user device from the advertisement platform server, the generic ad response including a discovery pixel and an ad transaction pixel, the discovery pixel and the ad transaction pixel each being a snippet of code;
   c. initiating a discovery process by the advertisement platform server based on the reception of the discovery pixel from the user device;
   d. using an identity mapping table maintained by a telecommunications provider to establish a relationship between an application-level identity on the user device and a network-level device identifier;
   e. utilizing intelligence about the user device at the application level based on the relationship established in step (d);
   f. after a predetermined period of time has elapsed from when the discovery pixel was sent by the user device to the advertisement platform server, receiving the ad transaction pixel from the user device on the advertisement platform server;
   g. prompted by the ad transaction pixel received by the user device in step (f), re-triggering the initial ad request by sending a relevant, targeted ad response to the user device based on results from steps (c), (d), and (e);
   h. prompted by the ad transaction pixel in step (f) and the targeted ad response in step (g), receiving on the advertisement platform server an ad download request from the user device; and
   i. sending back the ad requested in step (h) to the user device.

14. The method of claim 13, further comprising sending and receiving, by an advertisement network, instructions with the user device, and sending and receiving, by the advertisement network, instructions with the advertisement platform server.

15. The method of claim 14, wherein the instructions received from and sent to the user device by the advertisement network comprise a device ad request and a device ad response.

16. The method of claim 14, wherein the instructions sent to and received from the advertisement platform server by the advertisement network comprise an ad recommendation request and an ad recommendation response.

17. The method of claim 13, further comprising receiving, by the advertisement platform server, an ad download request from the user device, and sending, by the advertisement platform server, an ad download to the user device.

18. The method of claim 17, wherein the ad download to the user device comprises an ad that is targeted to a user of the device.

19. The method of claim 1, further comprising receiving, by the advertisement platform server, a data request having an application-level identifier and a transitory network-level identifier, determining, by the advertisement platform server, a stable network-level identifier based on the transitory network-level identifier, and mapping, by the advertisement platform server, the application-level identifier to the stable network-level identifier.

20. The method of claim 19, wherein the determining comprises: extracting the transitory network-level identifier from the data request; and resolving the stable network-level identifier based on Internet Protocol (IP) address allocation records corresponding to the transitory network-level identifier.

21. The method of claim 19, wherein the application-level identifier is selected from the group consisting of a Hypertext Transfer Protocol cookie mechanism (HTTP cookie), a universally unique identifier (UUID), an open device identification number (ODIN), an Identifier for Advertisers (IDFA), an "Advertising ID" provided by Google Play services and a universal device identifier (UDID).

22. The method of claim 19, wherein the transitory network-level identifier comprises an Internet Protocol (IP) address.

23. The method of claim 19, wherein the stable network-level identifier is selected from the group consisting of a Media Access Control (MAC) address, an International Mobile Station Equipment Identity (IMEI), an International Mobile Subscriber Identity (IMSI) and a Mobile Station International Subscriber Directory Number (MSISDN).

* * * * *